UNITED STATES PATENT OFFICE.

FLETCHER B. HOLMES, OF WOODBURY, NEW JERSEY, ASSIGNOR TO THE E. I. DU PONT DE NEMOURS POWDER COMPANY, OF WILMINGTON, DELAWARE, A CORPORATION OF NEW JERSEY.

STABILIZED NITRATED STARCH.

No. 875,913.  Specification of Letters Patent.  Patented Jan. 7, 1908.

Application filed May 7, 1907. Serial No. 372,416.

*To all whom it may concern:*

Be it known that I, FLETCHER B. HOLMES, a citizen of the United States, residing at Woodbury, county of Gloucester, and State of New Jersey, have invented a new and useful Improvement in Stabilized Nitrated Starch, of which the following is a full, clear, and exact description.

The object of my invention is to produce stable nitrated starch.

Nitrated starch may be used as an explosive itself, or preferably may be used as a component part of an explosive, such as where it is mixed with sodium nitrate, potassium nitrate, or some other oxygen carrier, with or without the addition of other ingredients. The difficulty with nitrated starch is that it is very unstable, being liable to decomposition. When such nitrated starch decomposes, which it is liable to do at ordinary temperatures, it becomes liable to spontaneous combustion.

I have discovered that I can produce a stable nitrated starch by mixing with nitrated starch, produced in the ordinary manner, any ammonium salt of an oxygen acid of phosphorus. The mixing may be made in any manner to produce a good mixture. They may be mixed wet or dry and in any kind of a mixer. Preferably I mix the two in a finely divided powdered condition in a bowl provided with stirrers or paddles. I prefer to use a phosphate of ammonia and of the phosphates of ammonia, I prefer an orthophosphate of ammonia. Of the orthophosphates of ammonia, I prefer to use di-ammonium orthophosphate.

The following is an example of the manner in which my invention may be carried out, and the manner in which I have carried it out: With nitrated starch prepared in the ordinary and well known manner I mixed 3% of orthophosphate of ammonia $(NH_4)_2HPO_4$. I have used with success amounts of orthophosphate of ammonia less than 3%, and amounts larger than 3%. In practice I have used as high as 10%. Preferably I use from two to five per cent. of the reagent. The above is merely an example or examples of the carrying out of my method of stabilizing nitrated starch. I can and have also used the other orthophosphates of ammonia such as $(NH_4)_3PO_4$ and $(NH_4)H_2PO_4$. I can also use other phosphates of ammonia, such as $NH_4NaHPO_4$. I can also use phosphites.

I intend to include and cover in the claims nitrated starch stabilized by the addition of reagents herein set forth, whether the same be used as an explosive mixed with other ingredients, or used alone as an explosive.

Having now fully described my invention, what I claim and desire to protect by Letters Patent is:

1. A stable explosive, consisting of a mixture of nitrated starch and an ammonium salt of an oxygen acid of phosphorus, the latter being in such proportion as to stabilize the nitrated starch.

2. A stable explosive, consisting of a mixture of nitrated starch and from two to five per cent. of an ammonium salt of an oxygen acid of phosphorus.

3. A stable explosive, consisting of a mixture of nitrated starch and a phosphate of ammonia, the latter being in such proportion as to stabilize the nitrated starch.

4. A stable explosive, consisting of a mixture of nitrated starch and from two to five per cent. of a phosphate of ammonia.

5. A stable explosive, consisting of a mixture of nitrated starch and an orthophosphate of ammonia, the latter being in such proportion as to stabilize the nitrated starch.

6. A stable explosive, consisting of a mixture of nitrated starch and from two to five per cent. of an orthophosphate of ammonia.

7. A stable explosive, consisting of a mixture of nitrated starch and di-ammonium orthophosphate, the latter being in such proportion as to stabilize the nitrated starch.

8. A stable explosive, consisting of a mixture of nitrated starch and from two to five per cent. of di-ammonium orthophosphate.

In testimony of which invention, I have hereunto set my hand, at Woodbury, N. J., on this 29th day of April, 1907.

FLETCHER B. HOLMES.

Witnesses:
J. FRANK WILSON, Jr.,
GEORGE E. PIERSON.